(12) United States Patent
Ramanathan (10) Patent No.: US 9,448,449 B2
(45) Date of Patent: Sep. 20, 2016

(54) GLARE REDUCTION SYSTEM

(71) Applicant: Venkataraman Ramanathan, Chennai (IN)

(72) Inventor: Venkataraman Ramanathan, Chennai (IN)

( * ) Notice: Subject to any disclaimer, the term of this patent is extended or adjusted under 35 U.S.C. 154(b) by 512 days.

(21) Appl. No.: 13/890,756

(22) Filed: May 9, 2013

(65) Prior Publication Data
US 2014/0211114 A1     Jul. 31, 2014

(30) Foreign Application Priority Data

Jan. 31, 2013   (IN) .............................. 437/CHE/2013

(51) Int. Cl.
| | | |
|---|---|---|
| *G02F 1/133* | (2006.01) | |
| *G02F 1/1347* | (2006.01) | |
| *B60R 1/08* | (2006.01) | |
| *G02F 1/1335* | (2006.01) | |

(52) U.S. Cl.
CPC ............. *G02F 1/1347* (2013.01); *B60R 1/088* (2013.01); *G02F 2001/133531* (2013.01)

(58) Field of Classification Search
CPC ..... B60R 1/088; B60R 99/00; G02F 1/1347; G02F 2001/133531; G02B 27/01; G02B 2027/0118
See application file for complete search history.

(56) References Cited

U.S. PATENT DOCUMENTS

| | | |
|---|---|---|
| 4,364,039 A | 12/1982 | Penz |
| 4,443,057 A | 4/1984 | Bauer et al. |
| 4,927,240 A | 5/1990 | Stolov et al. |
| 4,952,029 A | 8/1990 | Hayashi et al. |
| 5,044,732 A | 9/1991 | Kimura |
| 5,067,795 A | 11/1991 | Senatore |
| 6,144,359 A | 11/2000 | Grave |
| 6,247,820 B1 | 6/2001 | Van Order |
| 6,690,268 B2 | 2/2004 | Schofield et al. |
| 6,710,831 B1 | 3/2004 | Winker et al. |
| 7,564,517 B2 * | 7/2009 | Daiku ............... G02F 1/133615 349/61 |
| 7,580,085 B2 | 8/2009 | Jacobs et al. |
| 7,656,586 B2 | 2/2010 | Rosario et al. |
| 8,022,924 B2 * | 9/2011 | Weng ................... G09G 3/3413 345/102 |
| 8,432,340 B2 * | 4/2013 | Okita ................... G09G 3/3648 345/694 |

(Continued)

FOREIGN PATENT DOCUMENTS

| | | |
|---|---|---|
| EP | 237163 | 9/1987 |
| EP | 2106971 | 10/2009 |
| EP | 2378350 | 10/2011 |

OTHER PUBLICATIONS

King-Wai Yau, "Phototransduction Mechanism in Retinal Rods and Cones," The Friendwald Lecture, Investigative Ophthalmology & Visual Science, Jan. 1994, vol. 35, No. 1, 24 pages.

(Continued)

*Primary Examiner* — Abbas Abdulselam
(74) *Attorney, Agent, or Firm* — Klarquist Sparkman, LLP (57) ABSTRACT

A glare reduction system is disclosed including a display device configured for placement in a line of sight of an object. The display device includes a plurality of picture elements without a color filter. Each of the picture elements have a pair of spaced apart polarizing elements in substantially parallel orientation with respect to each other, and a liquid crystal element between the polarizing elements. An imaging source is provided to receive light from the object. The glare reduction system further includes a display driver to process the received light to generate a voltage signal, and selectively provide the voltage signal to one or more of the picture elements in order to regulate the opacity of the display device.

18 Claims, 7 Drawing Sheets

(56) References Cited

U.S. PATENT DOCUMENTS

| | | | |
|---|---|---|---|
| 8,610,846 B2* | 12/2013 | Ishitani | G02F 1/133528 349/117 |
| 8,670,091 B2* | 3/2014 | Egi | G02F 1/133533 349/104 |
| 2006/0055713 A1 | 3/2006 | Asao et al. | |
| 2006/0140502 A1 | 6/2006 | Tseng et al. | |
| 2006/0171704 A1 | 8/2006 | Bingle et al. | |
| 2007/0126687 A1* | 6/2007 | Choi | G09G 3/3611 345/98 |
| 2009/0091634 A1* | 4/2009 | Kennedy | G02B 23/12 348/217.1 |
| 2009/0096937 A1 | 4/2009 | Bauer et al. | |
| 2009/0147186 A1 | 6/2009 | Nakal | |
| 2009/0174847 A1 | 7/2009 | Kuno | |
| 2009/0204207 A1 | 8/2009 | Blum et al. | |
| 2009/0257122 A1 | 10/2009 | Hara | |
| 2010/0002018 A1 | 1/2010 | Hirata | |
| 2011/0149212 A1 | 6/2011 | Tomita | |
| 2011/0273659 A1 | 11/2011 | Sobecki | |
| 2011/0317002 A1 | 12/2011 | Muresan et al. | |
| 2013/0147851 A1 | 6/2013 | Yim et al. | |
| 2013/0215103 A1 | 8/2013 | Chiu | |
| 2013/0236998 A1* | 9/2013 | Jia | H01L 27/1288 438/34 |
| 2013/0286177 A1 | 10/2013 | Deleeuw et al. | |
| 2013/0300728 A1 | 11/2013 | Reichow | |
| 2013/0338882 A1 | 12/2013 | Baur | |
| 2014/0253848 A1 | 9/2014 | Wammes | |
| 2014/0267203 A1 | 9/2014 | Ramanathan | |

OTHER PUBLICATIONS

Rumar, "Relative Merits of the U.S. and Ece High-Beam Maximum Intensities and of Two-and-Four-Headlamp Systems," University of Michigan Transportation Research Institute, Nov. 2000, 52 pages.
Mess, Charles Edward Kenneth, "The Fundamentals of Photography and Other Things," Eastman Kodak Company, 1920, 120 pages.

* cited by examiner

GLARE REDUCTION SYSTEM

TECHNICAL FIELD

The present invention relates to a glare reduction system, and more particularly to a display device with design modifications to achieve the purpose.

BACKGROUND

It is well known that sudden strobe-like ultra-bright flashes at night time may cause visibility problems for the humans. Such bright lights cause hyper-polarization of the retinal cells in the eye. The hyper-polarized cells take an order of around 2- 3 seconds (time magnitude) to clear the effect. The visibility during this recycle time is challenged. In low-light, and particularly in anxiety and fear, the human eye's iris enlarges to enhance peripheral vision. The enlarged iris further increases sensitivity towards these sudden bright lights that hit the eye, by allowing large exposure values for the retinal cells. As an effect, the iris closes down to bring down the average light to avoid retinal rod/cone damage, thereby reducing the peripheral vision.

In the particular case of automobiles, it is observed that high-beam reach of at least 200 feet is required for vehicle travelling at speeds of 65 mph (or 96.3 ft./sec) to gain reaction time of 1.5 seconds, given the breaking distance of about 50 feet at such a pace. Therefore, intense lights akin to spot lights are required to narrowly focus down the area of lighting to use available energy over a large distance. Such oncoming automobiles' high-beam headlights or extremely bright spots may cause the problem with driver's visibility in the vehicle ahead. At this stage, the shadowy regions of the scene get blocked out due to automatic control of overall exposure, thereby reducing any information available in the low-light zones. The loss of detail increases anxiety and fear, further increasing adrenalin which in turn tries to widen the closed-down iris to enhance peripheral vision in futility. This oscillatory (albeit negatively) reinforcing feedback loop results in high-stress and is caused by lack of visibility of details in the shadows. This is akin to panic attack situation and could result in accidents. This demonstrates a need for a device to avoid loss of visibility from oncoming headlights or the like.

The systems and methods known in the art approach this problem by using photosensitive materials, such as, electrochromic glass, using chemical means to achieve dimming of bright lights passed through. Such system averages the light intensity on the entire viewing surface, and therefore results in poor detail in the shadows. Therefore, there is a need of a device which may help to reduce glare without loss of any details. The system of the present disclosure enables to spatially and selectively process the incoming light for reducing glare, and thus provide better control over the visibility over the viewing surface.

US Patent Publication Number 20060140502 discloses a field-of-vision processing and filtering system for eliminating glare from mobile and transient light sources and reflective surfaces, using image recording, eye-position detection, and an active matrix screen functioning as a dynamically controllable visor, for modifying the field of vision appropriately. One embodiment of the system can be used by drivers for filtering glare from oncoming headlight at night, as well as during day time to block glare from the sun. The system uses multiple cameras placed appropriately to record the driver's field-of-vision. The system then filters out high light intensity points from the field-of-vision using digital processing employing some algorithms. The end image is displayed by computing the field-of-view of the driver's eye and producing the appropriate camera feed, after processing, on the display. The system disclosed is an image processing device to digitally compute the translational and rotational movement of the driver's face, and requires elaborate computation with demanding response times of the order of say 30 Hz on the part of the computer to compute the position of the blocking. To complicate this further, the opposing bright lights from automobiles constantly moves position as well when they are close to the driver. So, the system requires high computation power and therefore would involve expensive components. In addition, there may be heavy parallax error between left and right eyes of the driver.

Another US Patent Publication Number 20060055713 discloses an ECB-type (Electrically Controlled Birefringence effect type) liquid crystal display element. The display utilize a birefringent action of a liquid crystal and a polarization action, in which absorption of light by a color filter does not occur, and therefore the light transmittance can be increased to obtain bright color display. In addition, since birefringent characteristics of a liquid crystal layer vary depending on voltages, the colors of transmitted light and/or reflected light may be changed by controlling the voltage applied to a liquid crystal cell. By utilizing this, a plurality of colors can be displayed with the same pixel. The purpose of this invention is to improve the brightness of the displayed colors by removing the color filter, and avoiding the color loss thereon. However in the mode of transmission, such system only relates to color rendition.

SUMMARY

In one aspect, the present disclosure provides a display device. The display device includes a plurality of picture elements without a color filter. Each of the picture elements includes a pair of spaced apart polarizing elements in substantially parallel orientation with respect to each other and a liquid crystal element disposed between the polarizing elements. A display driver is configured to selectively provide a voltage signal to one or more of the picture elements in order to regulate the opacity of the display device.

In another aspect, the present disclosure provides a glare reduction system. The glare reduction system includes a display device configured for placement in a line of sight of an object to be displayed. The display device includes a plurality of picture elements without a color filter. Each of the picture elements includes a pair of spaced apart polarizing elements in substantially parallel orientation with respect to each other and a liquid crystal element disposed between the polarizing elements. An imaging source is provided to receive light from the object to be displayed. A display driver is configured to process the received light to generate a voltage signal, and selectively provide the voltage signal to one or more of the picture elements in order to regulate the opacity of the display device.

In yet another aspect, the present disclosure provides a method of glare reduction for a display device having a plurality of picture elements. The method includes receiving light, from an imaging source, corresponding to an object to be displayed. Further, the method includes processing the received light to generate a voltage signal, and addressing the picture elements, without a color filter, to respond to the generated voltage signal. The method further includes displaying an end image of the object at the picture elements, using the light passed from a first polarizing element and a second polarizing element, in the display device, disposed in substantially parallel orientation with respect to each other.

Figure 1:
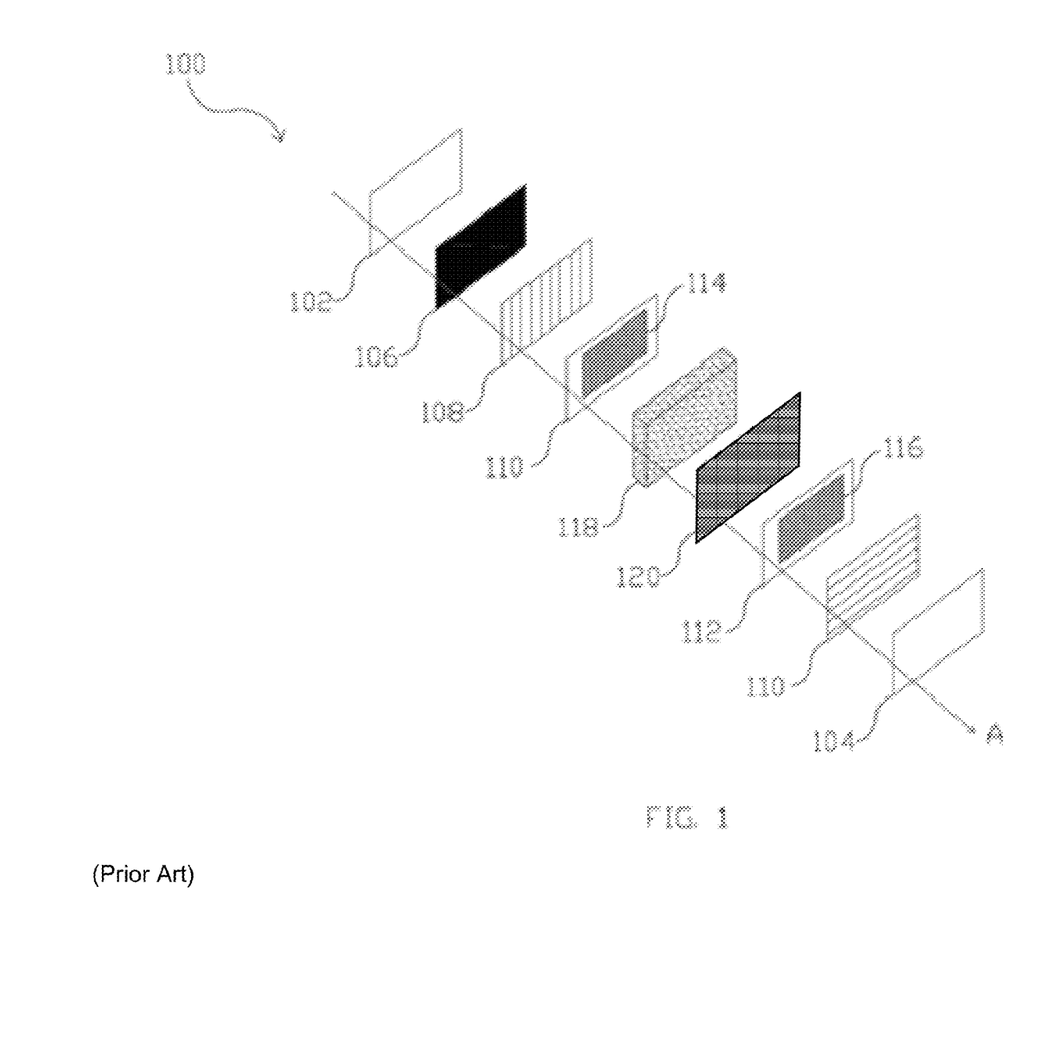
FIG. 1 illustrates an exploded schematic view of traditional liquid crystal display device.

DETAILED DESCRIPTION:

The present invention has been described in detail with reference to the accompanying figures. FIG. 1 illustrates a traditional Liquid Crystal Display system 100. The system 100 includes a first and a second transparent sheet 102, 104 between which the various components are sandwiched. A backlight source 106 is disposed to provide light for the display system 100. FIG. 1 shows an arrow 'A' which indicates the direction of light flow from the rear light panel to the eye. The system 100 further includes a first polarizing sheet 108 that allows for vertically polarized light to pass through. A first and second transparent substrate 110, 112 having a conductive layer of electrodes 114, 116 are provided. A liquid crystal layer 118 is disposed between the substrates 110, 112, to selectively and variably apply potential difference to each area of crystal, defining a sub-pixel.

The liquid crystal layer 118 has a uniform rotation of light without the application of the voltage, that is, in an unexcited state. In an excited state, the crystal elements rotate light from the first polarizing sheet uniformly at an angle dependent on the input signal voltage. A color panel 120 is also included with a polymer pigmentation layer that overlays RGB (Red, Green and Blue) pigments on top of the liquid crystal layer. Typically, the sub-pixels are differentiated as three vertically aligned strips of colors, namely, Red, Green and Blue of 1/3rd of the area each, which together constitutes a pixel for the display. Alternate systems use four sub-pixels, with an additional sub-pixel of cyan, yellow, white or the like colors. It is often the case that color pigment is deposited (or printed) on the glass panels of the liquid crystal layer 118 through various processes such as printing/dye-sublimation printing etc. Also, a second polarizing sheet 110 is disposed with a polarizing angle that is aligned perpendicular to the first polarizing sheet and the liquid crystal layer, to allow no light to pass through.

Depending on the voltage applied to each picture element, the crystal rotates the polarization angle of light in various degrees from 0 to 90 degrees. The light that passes through these sub-pixels flows through the colored panel 120, picks up a hue and hits the polarizing sheet in various angles between being perpendicular to being fully-aligned. The brightness of that sub-pixel when looked straight upon, is determined by I×cos (θ), where I is the original intensity of light and θ is the angle between the polarized light from the liquid crystal layer 118 and the second polarizing sheet 110, thus allowing controllability of intensity of each sub-pixel. When intensity of light from each sub-pixel is controlled, the composite light from the pixel of three hues Red, Green and Blue, makes possible a multitude of colors when viewed from a distance. A traditional display system described above with the above said polarizer arrangement makes it opaque when no potential difference is applied to any of the sub-pixels.

Figure 2:
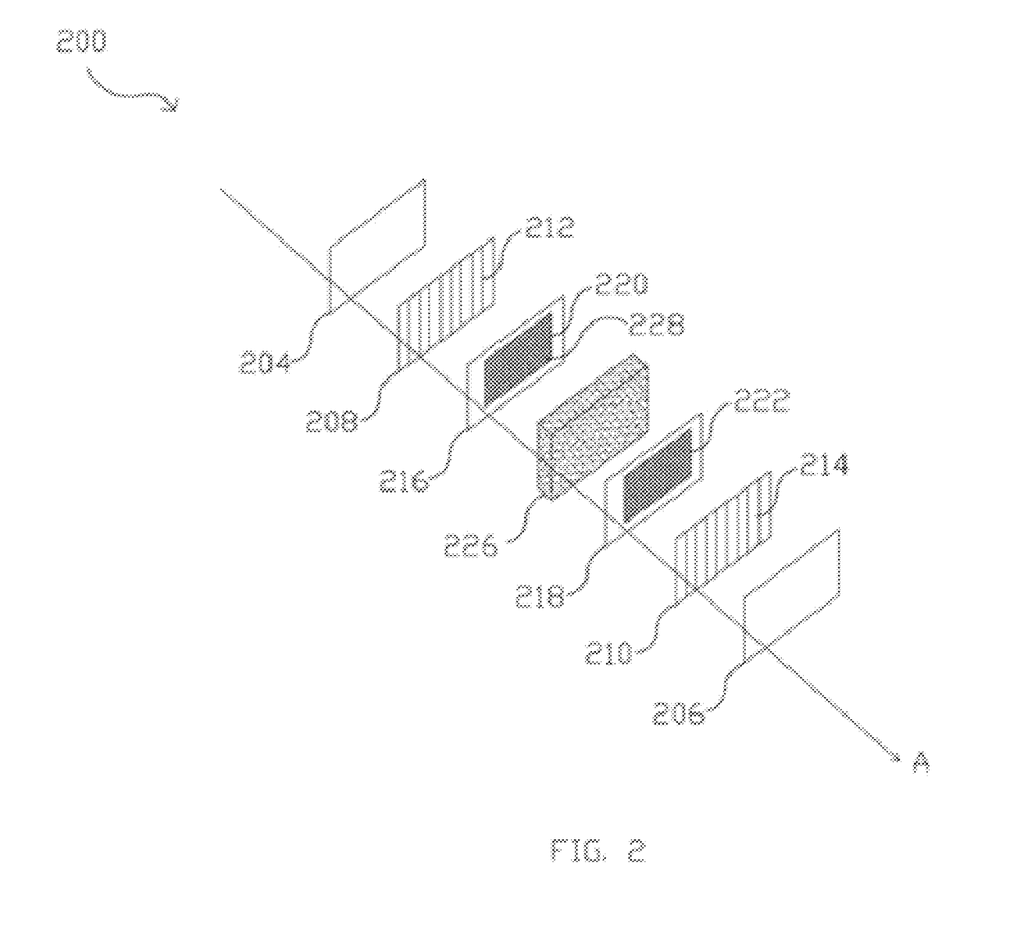
FIG. 2 illustrates an exploded schematic view of display device in accordance with an embodiment of the present disclosure.

FIG. 2 illustrates a display device 200 in accordance with an embodiment of the present disclosure. The display device 200 of the present disclosure is principally a liquid crystal display (LCD) as traditionally known in the art with design modifications. Essentially, the display device 200 has been designed to be substantially transparent, and be employed for field-of-vision applications using the received light from an object, in front. Therefore, it may be understood that the display device 200 may not require a backlight source, such as the backlight source 106 as employed in a traditional display system 100.

The display device 200 may include a frame (not shown) to support the various components therein. The frame is basically an adjustable mounting bracket that provides space for mounting the various components of the display device 200 thereon. A first transparent panel 204 and a second transparent panel 206, preferably of glass, are mounted over the frame. The first and the second transparent panels 204, 206 are disposed in a planar relationship with respect to each other. Further, the panels 204, 206 are spaced apart by suitable spacers not shown by approximately 0.25 to 2 millimeters, although the spacing may in some instances be as little as 0.1 to 0.05 millimeters.

The display device 200 further includes a pair of polarizing sheets, that is, a first polarizer 208 and a second polarizer 210. The first polarizer 208 and the second polarizer 210 are disposed facing the first transparent panels 204 and the second transparent panels 206, respectively. The first and second polarizers 208, 210 may be construed to include a plurality of corresponding first polarizing elements 212 and second polarizing elements 214. It may be contemplated that the polarizing elements 212, 214 are slits in the polarizing sheets that provide the transmission axis for the light to pass through. According to an embodiment, the first and the second polarizing elements 212, 214 have the directions of polarization parallel to each other. For the purpose of the present disclosure, the display device 200 may be constructed with the two polarizing elements 212, 214 in vertical orientation. However, the two polarizing elements 212, 214 in horizontal orientation may also serve the purpose. The similar orientation allows the display device 200 to permit substantially all the light from the background to pass through.

Further, a pair of transparent substrates 216, 218 is disposed on the interior surfaces of the polarizers 208, 210. The transparent substrates 216, 218 include coatings 220 and 222 of transparent electro-conductive material, such as, the known oxide or indium oxide coatings, deposited thereon. These coatings 220, 222 are quite thin and highly resistive, for example, on order of 150 ohms per unit square or above possibly as high as 5,000 to 10,000 ohms per unit square.

As illustrated, the first and second substrates 216, 218 further define a space therebetween, filled with a liquid crystal material. The liquid crystal material includes a plurality of nematic-phase liquid crystal elements 226 with a positive dielectric anisotropy. In the display device 200, the liquid crystal element 226 tends to align with the polarizing element 212, 214 in an unexcited state, that is, in the absence of any voltage signal. The liquid crystal element 226 has a property to rotate the polarization angle of the light passing through based on the voltage response.

In the preparation of the display device 200, the coatings of conducting material 220, 222 that are in contact with the liquid crystal elements 226 may be prepared by being stroked or rubbed with, for example, a cotton cloth. For the purpose of the present disclosure, the directions of rubbing on the respective substrates 216, 218 are parallel to each other to prepare the respective horizontal and vertical electrodes. The plurality of electrodes facing each other provided on each of said substrates to form a matrix electrode structure, wherein the intersections of the electrodes define sub-pixels or picture elements 228 in the display device 200.

In the display device 200, having the above-described construction, the end image to be displayed is established by selectively applying voltages between the horizontal and the vertical electrodes, so that each picture element 228 at the intersection of two electrodes either transmits or blocks the light through each of the picture element. It may be contemplated by a person ordinarily skilled in the art that each of the picture elements 228 represents a sub-pixel for the display device 200. Hereinafter, the terms "picture element" and "sub-pixel" have been interchangeably used.

The display device 200 has certain distinct design features as compared to the traditional display system 100. Following is a description of such features of the display device 200 in view of a traditional display system 100.

(a) Polarizer Reorientation:

According to an embodiment of the present disclosure, the first and second polarizing elements 212, 214 are disposed in substantially parallel orientation with respect to each other, that is, the transmission axis for the polarizing elements are aligned, in contrast to the traditional display system 100 in which the transmission axes cross each other. After re-orientation of the two polarizing elements 212, 214 as described above, the display device 200 is transparent to the extent permitted by the transparency of the various panels and their native light absorption properties notwithstanding orientation.

This reversal causes optical inversion for all colors as seen through the traditional display system 100. For instance, if the traditional display system 100 were to transmit red light, the red sub-pixel is made transparent while the green and blue sub-pixels are shut off (made opaque). With this novel reversal, the red pixel is made opaque while the green and blue sub-pixels regions are made transparent.

When a potential difference is applied to the picture element 228, the light passing through the liquid crystal element 226 is rotated away from the perfect alignment commensurate to the voltage signal V being applied, and hence imposes a controllable degree of opacity on the picture element 228. This opacity is a measure to the degree of light allowed through the panel, and corresponds to the amount of light received from the object in the display device 200. If the electronic equivalent of the image observed by the display device of the present disclosure, opaque spots appear in the line-of-sight wherever full transparency was obtained in the traditional system, and vice versa.

(b) Removal of Color Sub-pixel pigmentation matrix:

Traditional display system 100 also includes a color sub-pixel matrix 120, as illustrated in FIG. 1. Specifically, such display system includes a pigmentation layer on one of the glass substrate, such as, the polarizing sheet or the conductive substrate, formed during the manufacturing stage. However, in the display device 200 of the present disclosure, the pigmentation layer or the color filter is entirely removed. This allows for selective color filtering and reduced opacity achievable by using the transparent panel and the colors from the light of the object in front.

Figure 3:
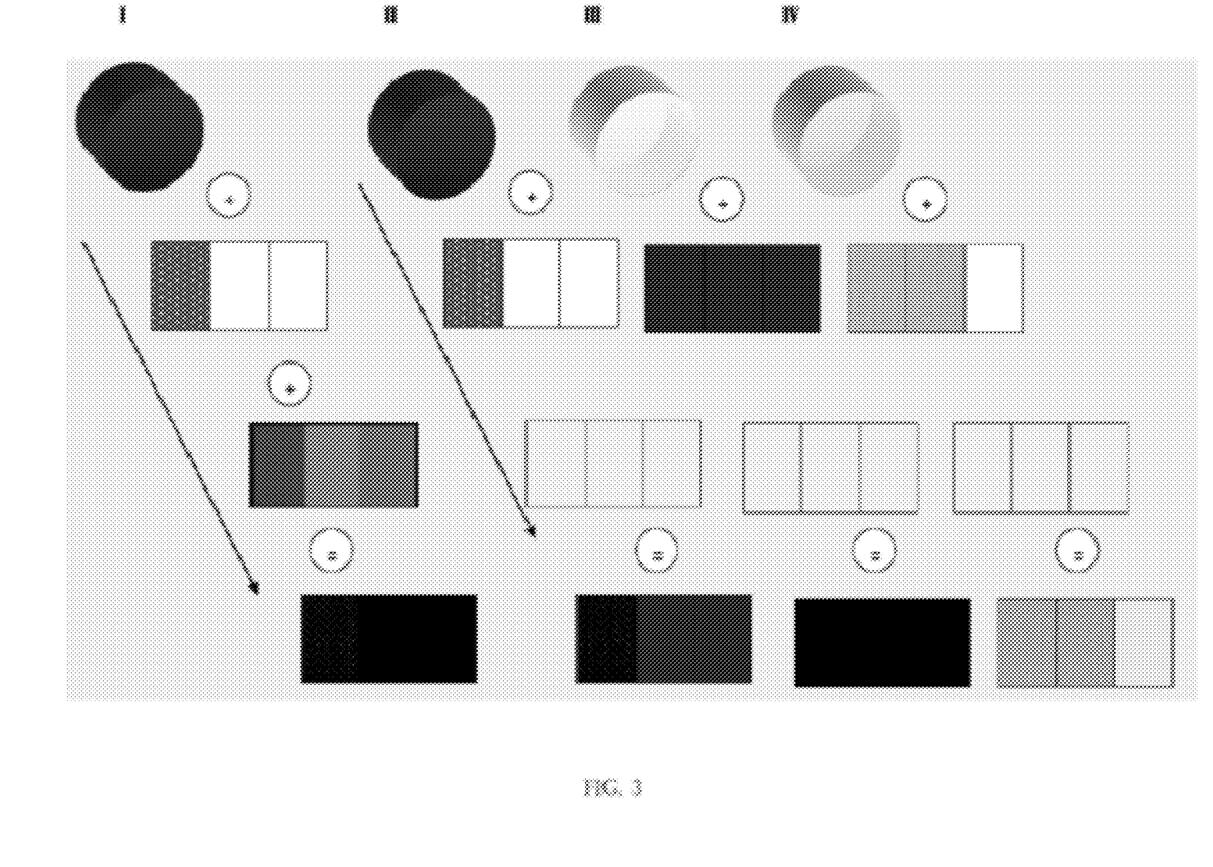
FIG. 3 illustrates a schematic showing the effect of removing a color filter in the display device in view of a traditional display device, in accordance with an embodiment of the present disclosure.

FIG. 3 illustrates the response to various colors, for a traditional display system and the display device 200 of the present disclosure. For exemplary purposes, section I of FIG. 3 shows the output for a red color light from the point of view of a traditional display system 100 with the color filter 120. In case of red light, the blue and green primary colored sub-pixel regions do not permit red light to pass through and hence will remain black. It is known that the red color intensity is about 50% of the white light. Therefore, the red sub-pixel is turned about 50% or partially opaque to allow approximately 50% of the red light. So, it may be seen that the total light transmitted is about 1/6 of the total incident light.

The section II of FIG. 3 shows the display device 200 of the present disclosure without the color impregnated. In case of red light received, the red part of the pixel, i.e., R sub-pixel is regulated. Again as described above, the red sub-pixel is turned about 50% or partially opaque to allow approximately 50% of the red light. However, the other two sub-pixels are held open to allow all the light therethrough. Therefore, it may be seen that with no color rendition, red light passes through 2/3rd of the pixel and is only affected in the 1/3rd corresponding to its sub-pixel, thereby allowing more than 2/3rd of the red light to pass through across the area of the entire pixel.

Note from section III that in the case of bright white light, all three regions are made fully opaque and hence deliver a dark pixel.

In the case of composite colors such as yellow light, as shown in section IV, which splits itself into red and green when rendered and sensitize the same sub-pixels by the camera's CMOS Sensor, only 50% opacity on both red and green areas result, and hence the total brightness ratio achieved is approximately 1/6+1/6+1/3=2/3 of the incident yellow light. Therefore for composite colors, the sum of the intensity is a parametric opacity below 1/3rd, or transmission of $2/3^{rd}$ of the total incident light.

In the examples of FIG. 3, in section I, the color received is red; the sub-pixels are red, green, and blue; and the result is partial red, black, and black. In section II, the color received is red; the sub pixels are held open; and the result is partial red, red, and red. In section III, bright white light is received; all three regions are made fully opaque; and the result is black, black, and black. In section IV, yellow is received; and the result is partial yellow, partial yellow, and yellow. For illustration purposes, the sub-pixels are shown as three portions of the center rectangles (i.e., red, green, and blue).

Figure 4:
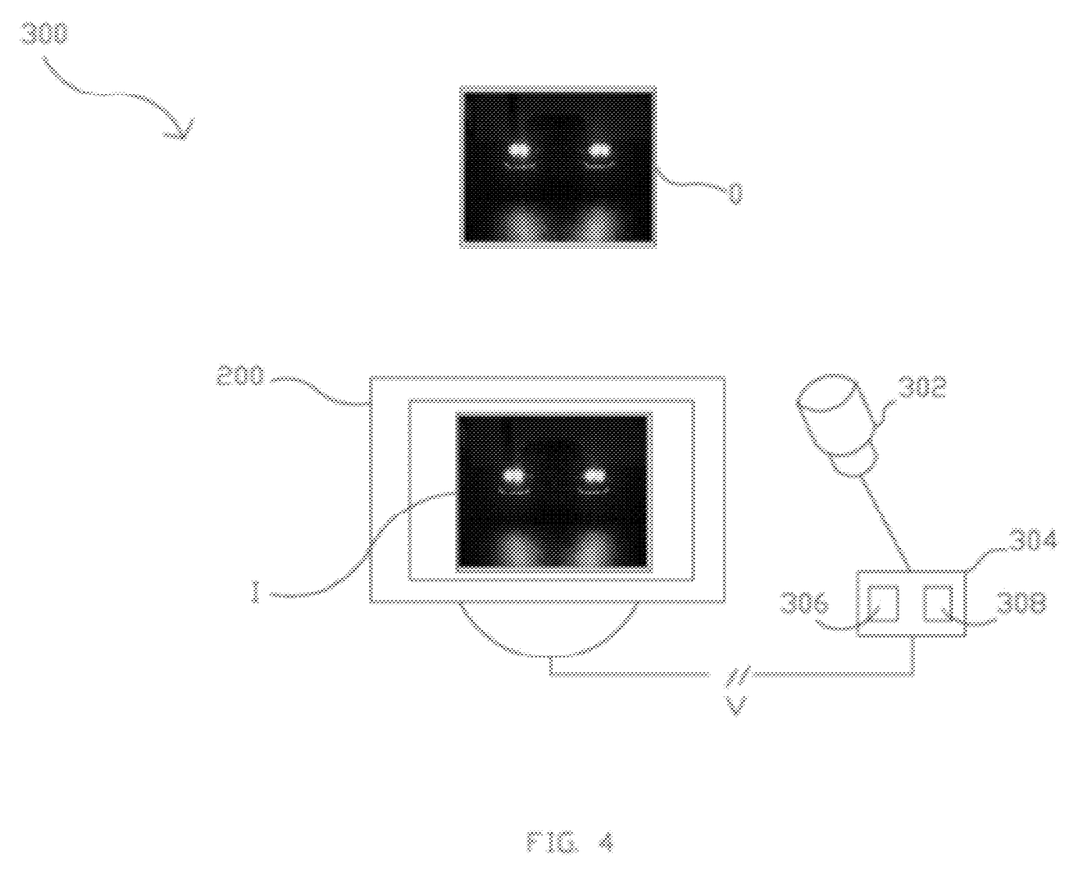
FIG. 4 illustrates a glare reduction system employing the display device, in accordance with an embodiment of the present disclosure.

Further, FIG. 4 illustrates a glare reduction system 300 in which the display device 200, as described above, may be implemented. In accordance with an embodiment of the present disclosure, the glare reduction system 300 includes an imaging source 302, such as, a fixed-focus camera conventionally known in the art. The imaging source 302 may be positioned to receive light from an object O in field-of-vision of a user in front of the display device 200.

The glare reduction system 300 further includes a display driver 304 which may essentially be a processing system. It may be contemplated that the display driver 304 may be integrated with the display device 200. The display driver 304 includes a CMOS sensor 306 configured to convert the received light from the imaging source 302 into a corresponding voltage signal V indicative of the intensity of the incident light received from the object, in front of the imaging source 302.

The CMOS sensor 306 may further be configured to provide an image signal for the light intensity values below a defined threshold value. The threshold value may be defined based on the different applications of the system. In an embodiment, the threshold cut-off is achieved by using the ISO setting, which affects sensitivity of the CMOS sensor. In particular, the threshold setting utilizes the ISO setting as a filter to let only the brighter lights to generate signals in the CMOS sensor 306, that is, the threshold is like a cut off of the light's energy in being able to affect the CMOS sensor 306, below which the CMOS sensor 306 doesn't react and hence there is no corresponding voltage signal V generated. In an embodiment, the CMOS sensor 306 may further be configured to produce an image mask which is optically inverted from the received light, that is, the image signal would have bright areas darkened and vice versa.

In an embodiment, the display driver 304 may further include a calibrating unit 308 configured to filter or calibrate the image signal, received from the CMOS sensor 306. In a preferred embodiment, the calibrating unit 308 is a traditional NTSC analog video controller. The calibrating unit 308 enables to adjust color saturation, contrast and brightness of the display device 200. In particular, the calibrating unit 308 may be configured to control the contrast setting, and therefore affect the darkness or brightness of an end image I produced on the display device 200. The CMOS sensor 306 and the calibrating unit 308, of the display driver 304, are traditionally known in the art, and typically are integrated with the imaging source 302 and the display device 200, respectively.

Further, the display driver 304 is further configured to deliver the processed voltage signal V to the liquid crystal elements 210. The voltage signal V excites the specific liquid crystal element 214 which orients in response to alter the opacity of the corresponding picture element 228. Therefore, the system 300 allows for addressing of each picture element, to display the end image I at the display device 200.

In an embodiment, the system employs a suppressive feedback method. The method includes generating a voltage signal V for the light received from the CMOS sensor 306. Further, the method includes addressing the picture elements, without the color filter, to respond to the generated voltage signal V. Finally, the method includes displaying the end image I of the object O at the picture elements 228, by means of the light passed from the first polarizing element 208 and the second polarizing element 210 disposed in substantially parallel orientation with respect to each other.

It may be contemplated by a person ordinarily skilled in the art that the picture element 228 lit Black will not permit light to pass through the display device 200 of the present disclosure and hence become opaque in the line of sight. However, they don't block the intense lights completely, and serve to take 'the edge off'. The picture element 228 not lit at all will be transparent and pass light through the display device 200. However, the picture elements 228 lit in the grey-scale may cause dimming of light due to angular misalignment of polarizing elements 228 between the fully parallel and the fully perpendicular configuration. Further, the calibration unit 308 allows for adjusting the contrast of the display device 200, and therefore enables to regulate the intensity of the white light in the end image I.

According to an embodiment of the present disclosure, the system further utilizes the concept of "Circle of Confusion" to block the peak portion of the incident light. It may be understood that from far away (say 20'), the rays to the camera are approximately at the same spatial angle as the rays to the eye, hence no parallax or positional correction is required. The system 300 hence blurs (darkens, in the case of night time anti-flare application) the region that is sensitized behind the camera. The display device 200 has a higher resolution than the mingling of circles of confusion that the user gets to see. So, when the panel is mounted close to the eye, a few opaque pixels can produce diffuse circles-of-confusion effectively blocking the peak portion of the incident light in the line of sight.

INDUSTRIAL APPLICABILITY

The system 300 of the present disclosure, when used in the line of sight of the light emitting subject (like a visor in front of the oncoming headlights), it is derivable that the brightest of white lights will dim in proportion to their brightness to produce a dull grey light when shining through opaque regions of the display device 200. That is, the display driver 304, behind the imaging source 302, may be configured to develop a signal only on the picture elements 228 which corresponds to the incidence of high intensity light. This is achieved using the CMOS sensor 306 and the calibrating unit 308, in combination. This per sub-pixel signal when applied to the display device 200 makes the corresponding sub-pixels opaque, commensurate to the strength of signal and hence affects the brightness of the end image I observed through the display device 200.

FIG. 3 shows the response of the display device 200 to various colors. It may be understood that the display device 200 have varying degree of response to different colors. In contrast to white light where nearly 90%+reduction, in transmission, is achieved, primary and composite colors are rendered with at most 33% reduction. Whereas Red, Green and Blue pigments of the color filter in a traditional display system 100 take away approximately 50% of light intensity from the white light. In other words, on top of a pure white lit-from-behind surface such as a flat white fluorescent panel, if gelatin filters of Red or Green or Blue is placed directly, the measured luminosity of the colored light follows the aforementioned ratio. Since these are close together and reduce transmitted light's luminosity by about half, the traditional display with the color-pigment layer is at best, only half as transmitting as the display device 200 of the present disclosure.

Figure 5:
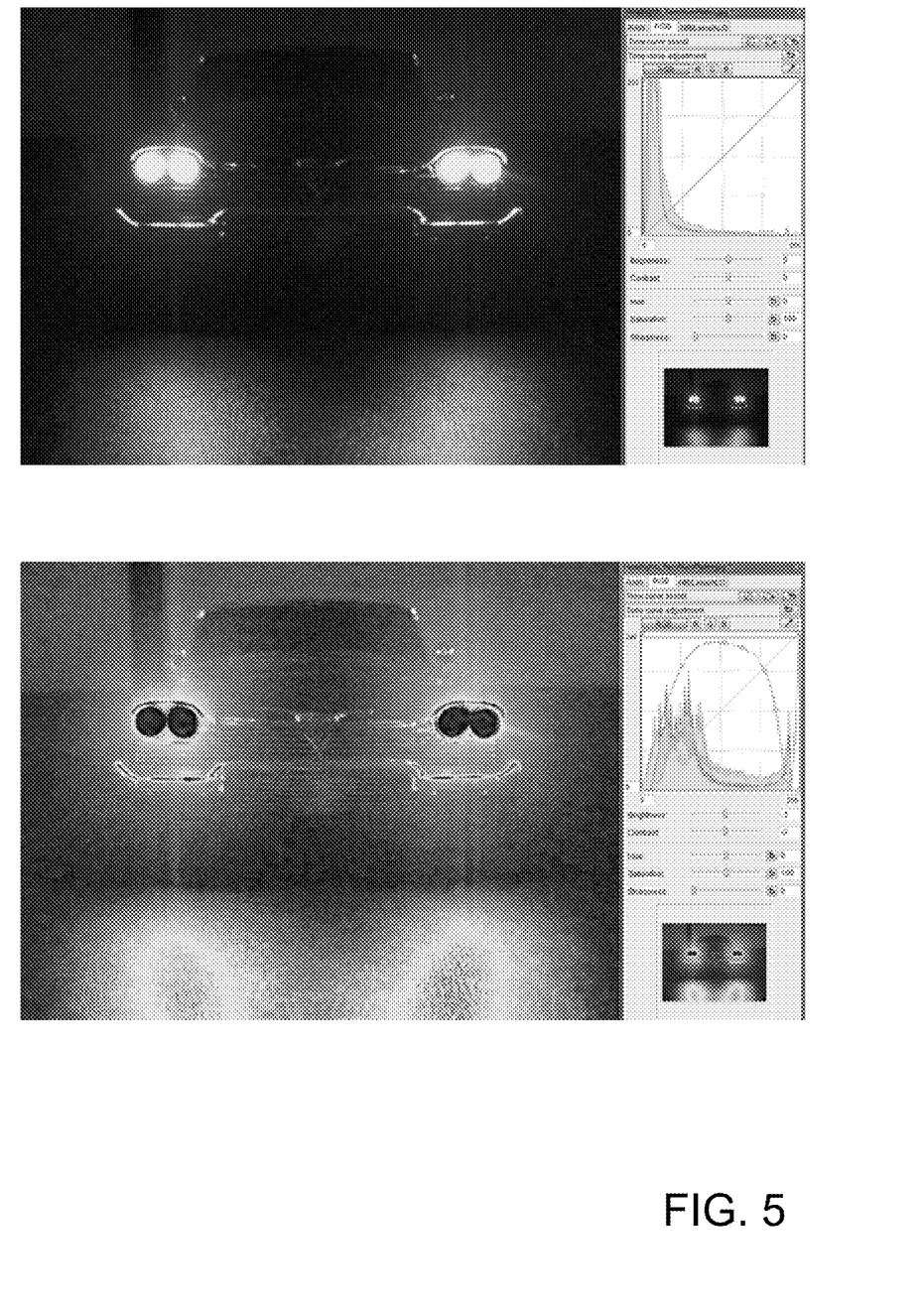
FIG. 5 shows an effect of the glare reduction system in accordance with an embodiment of the present disclosure.

In consideration of use of the system for driving/traffic applications, since the red, green and yellow lights are a source of annoyance, this provides for reduced, but not a full opacity response to such colors. However, the system provides significant reduction for bright white lights, such as the oncoming headlights, in order of approximately 90%. This is a very important consideration when the panel is used for night time driving notwithstanding the auto-adjustment of the eye's iris, where the bright flashes are significantly reduced whereas the traffic light colors are not significantly affected. FIG. 5 shows exemplary pictures and the RGB graph demonstrating the effect of using glare reduction system 300 of the present disclosure.

Further, the system 300 may be employed in various other applications. For example, the system 300 may be used in fire-fighting rescue operations where raging fire is very bright and the currently operational goggles reduce the brightness overall so as to not hurt the eye. This causes extreme reduction in detail impacting the response. Similarly, the system 300 may be used for snow rescue, as the light reflected from snow is ultra-bright and affects the eye due to hyper-polarization of majority of the retina, and could also lead to snow-blindness from continued exposure.

Figure 6:
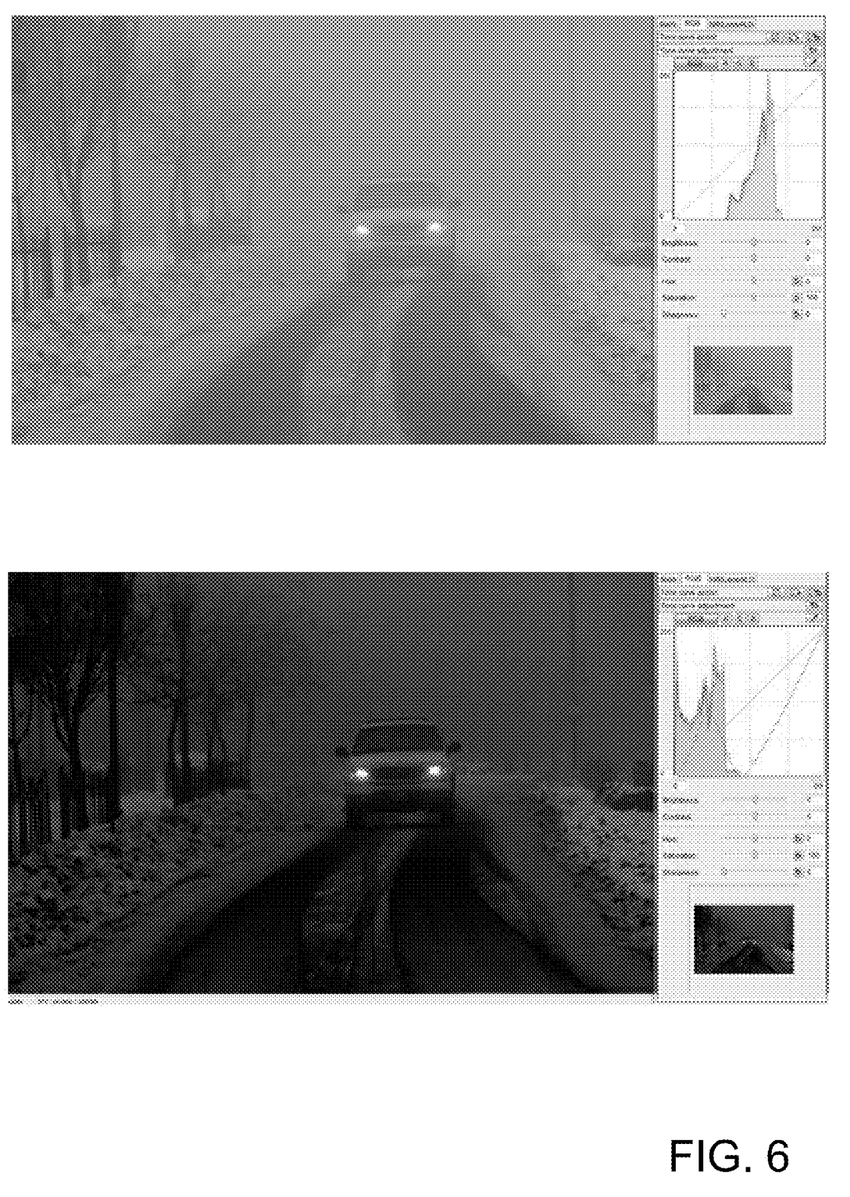
FIG. 6 shows an effect of the glare reduction system in accordance with an embodiment of the present disclosure.
Figure 7:
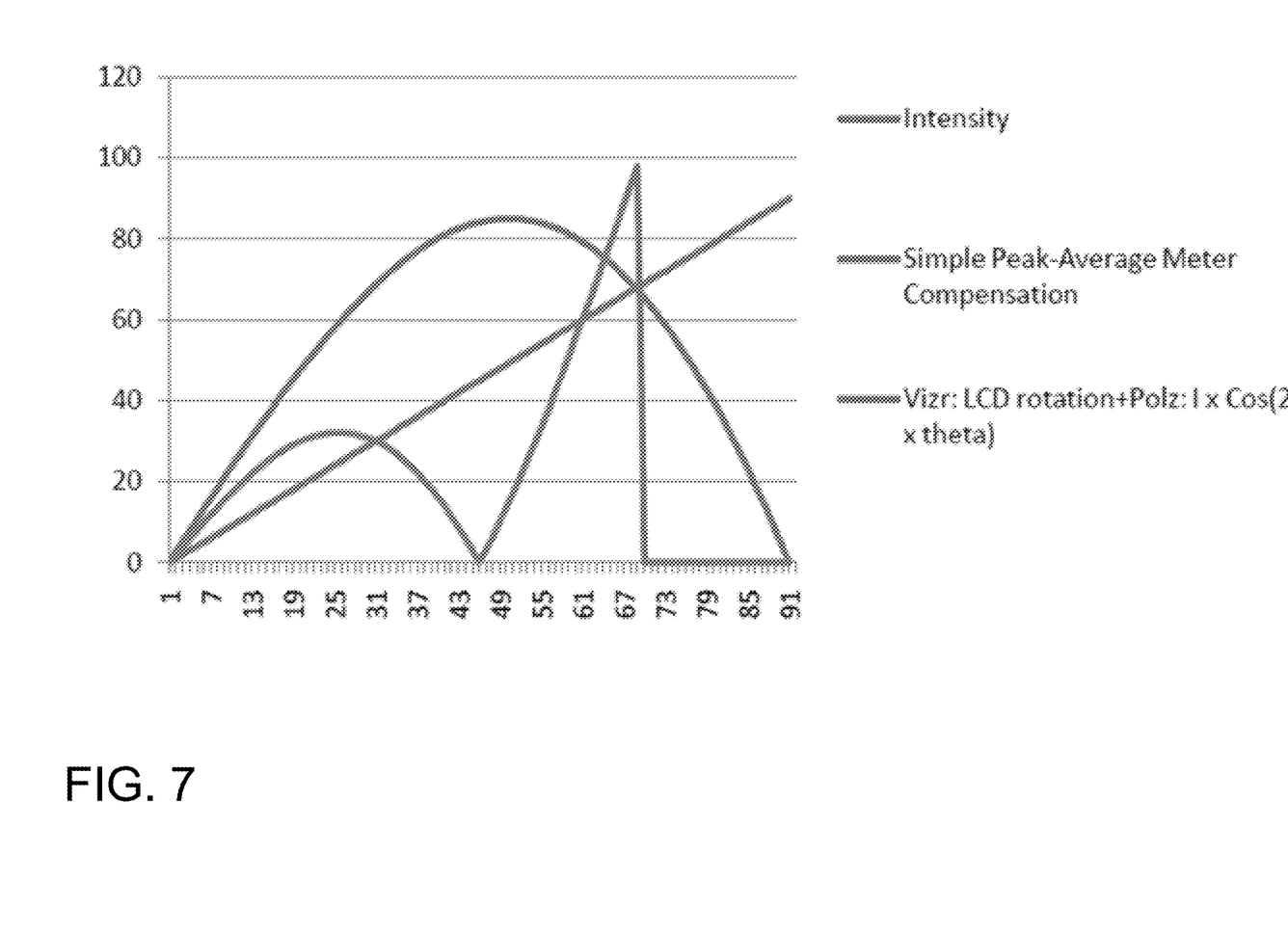
FIG. 7 depicts an effect of the glare reduction system in accordance with an embodiment of the present disclosure.

In another embodiment, two such display devices 200 of the present disclosure may be placed on top of each other with the polarizing layers in between removed, that is the second polarizer 208 of the first display device 200 and the first polarizer 206 of the second display device 200. Thereafter, the same voltage signal V is applied to these two display devices 200, with no polarizer in between. It may be understood by a person ordinarily skilled in the art that the composite rotation in such a device resembles I×Cos (2×theta), wherein theta is intensity of the received light on the CMOS sensor 306. Such system may particularly be applicable for fog isolation and contrast improvement. Therefore, the system 300 may be employed for fog commute where highlights and lowlights are lost due to a graying out at a narrow exposure value due to fog. FIG. 6 shows the effect of using two display devices 200 in the glare reduction system 300 for fog reduction. Further, as depicted in graph of FIG. 7, the blue (diagonal) curve theoretically shows the effect of using two display devices 200 in the glare reduction system 300 in accordance with this embodiment.

In yet another embodiment, the second display device 200, placed on top of the first display device 200 without the polarizers in between, may be reversed left to right. This results in cancellation of intensity or brightness manipulation leaving only differences between left and right halves of an object in front, say a human face. Such system may be employed for Identification processing.

It may be contemplated by a person ordinarily skilled in the art that for traffic applications, the display device may be required to produce a minimum frame rates for the driver's purpose. Since the system of the present disclosure utilizes an analog controller, it may be able to achieve a frame rate of more than 30 Hz, which would be sufficient for the purpose. However, the existing systems known in the art may need large processing power to achieve these minimum frame rates and therefore may not be employed for such critical applications as driving or the like.

Therefore, the method of the present disclosure utilizes the inverted optical properties of the traditional display device, used in the transparency mode, to impose suppression of bright light, by observing the oncoming real-life objects in the line-of-sight through a CMOS sensor in fixed-focus camera, and playing the appropriate processed per-sub-pixel signal from the CMOS sensor to the display device.

I claim:

1. A substantially transparent display device for placement in a line of sight of an object, the display device comprising:
    a plurality of picture elements without a color filter, wherein one or more picture elements of the plurality of picture elements receive light from the object;
    a pair of spaced apart polarizing elements in substantially parallel orientation with respect to each other;
    at least one liquid crystal element disposed between the pair of polarizing elements, wherein the plurality of picture elements, the pair of polarizing elements, and the at least one liquid crystal element are arranged in such a manner that the display device is transparent; and
    a display driver configured to:
        receive the light from the object;
        determine an intensity of the light received from the object; and
        selectively provide a voltage signal to the one or more picture elements when the intensity of light received by the one or more picture elements from the object is greater than a threshold, wherein the voltage signal corresponding to each of the one or more picture elements is determined based on the intensity of light received by the respective one or more picture elements, wherein the voltage signal regulates the opacity of the one or more picture elements to block at least a portion of the light from the object.

2. The display device of claim 1, wherein each of the plurality of picture elements represents a sub pixel.

3. The display device of claim 1, wherein the display driver is a CMOS sensor.

4. The display device of claim 1, wherein the display driver is an NTSC analog controller.

5. The display device of claim 1, wherein the display driver includes a CMOS sensor and an NTSC analog controller.

6. The display device of claim 1, wherein the display driver is configured to generate the voltage signal analogous to the intensity of the received light for at least one of the corresponding picture element.

7. The display device of claim 1, wherein each picture element includes two liquid crystal elements disposed between the polarizing elements.

8. A glare reduction system, comprising:
    a substantially transparent display device configured for placement in a line of sight of an object, the display device comprising:
        a plurality of picture elements without a color filter, wherein one or more picture elements of the plurality of picture elements receive light from the object;
        a pair of spaced apart polarizing elements in substantially parallel orientation with respect to each other; and
        at least one liquid crystal element disposed between the pair of polarizing elements, wherein the plurality of picture elements, the pair of polarizing elements, and the at least one liquid crystal element are arranged in such a manner that the display device is transparent; and
    A display driver comprising:
        an imaging source configured to receive the light from the object;
        wherein the display driver processes the received light to selectively generate a voltage signal for the one or more picture elements when intensity of light received from the object is greater than a threshold, wherein the voltage signal corresponding to each of the one or more picture elements is determined based on the intensity of light received by the respective one or more picture elements, and wherein the display driver provides the voltage signal to the one or more picture elements to regulate the opacity of the one or more picture elements to block at least a portion of the light from the object.

9. The glare reduction system of claim 8, wherein each of the plurality picture elements represents a sub pixel for the display device.

10. The glare reduction system of claim 8, wherein the display driver is a CMOS sensor.

11. The glare reduction system of claim 8, wherein the display driver is an NTSC analog controller.

12. The glare reduction system of claim 8, wherein the display driver includes a CMOS sensor and an NTSC analog controller.

13. The glare reduction system of claim 8, wherein the display driver is configured to generate the voltage signal analogous to the intensity of the received light for at least one of the corresponding picture element.

14. The glare reduction system of claim 8, wherein each picture element includes two liquid crystal elements disposed between the polarizing elements.

15. A method of glare reduction in a substantially transparent display device configured for placement in line of sight of an object to be displayed, the display device having a plurality of picture elements without a color filter, and a display driver, the method comprising:

receiving, by at least one picture element of the plurality of picture elements and the display driver, light from the object to be displayed;

processing, by the display driver, the received light to selectively generate a voltage signal for the at least one picture element out when an intensity of the light received from the object is greater than a threshold, wherein the voltage signal corresponding to the at least one picture element is determined based on the intensity of light received by the at least one picture element;

addressing the at least one picture element * to respond to the voltage signal to regulate the opacity of the at least one picture element to block at least a portion of the light received from the object; and displaying an end image of the object at the plurality of picture elements, by means of light passed from a first polarizing element and a second polarizing element, in the display device, the first and second polarizing elements being disposed in substantially parallel orientation with respect to each other.

16. The method of claim 15 further includes adjusting a contrast value of the display device in order to display the end image.

17. The method of claim 15 further includes adjusting a brightness value of the display device in order to display the end image.

18. The method of claim 15 further includes adjusting a color saturation of the display device in order to display the end image.

\* \* \* \* \*